(12) United States Patent
Bose

(10) Patent No.: US 7,421,954 B2
(45) Date of Patent: Sep. 9, 2008

(54) ACTIVE SUSPENSION CONTROLLER

(75) Inventor: Amar G. Bose, Wayland, MA (US)

(73) Assignee: Bose Corporation, Framingham, MA (US)

( * ) Notice: Subject to any disclaimer, the term of this patent is extended or adjusted under 35 U.S.C. 154(b) by 131 days.

(21) Appl. No.: 10/871,796

(22) Filed: Jun. 18, 2004

(65) Prior Publication Data

US 2005/0279244 A1 Dec. 22, 2005

(51) Int. Cl.
*B61F 1/00* (2006.01)
(52) U.S. Cl. .................................................. 105/209
(58) Field of Classification Search .............. 105/199.1, 105/199.2; 280/124.138, 6.12, 714; 364/424.5
See application file for complete search history.

(56) References Cited

U.S. PATENT DOCUMENTS

| | | | | |
|---|---|---|---|---|
| 4,803,627 A | * | 2/1989 | Yasuike et al. | 701/38 |
| 4,888,696 A | * | 12/1989 | Akatsu et al. | 701/38 |
| 4,960,290 A | | 10/1990 | Bose | |
| 4,981,309 A | | 1/1991 | Froeschle et al. | |
| 5,029,328 A | * | 7/1991 | Kamimura et al. | 701/38 |
| 5,058,017 A | * | 10/1991 | Adachi et al. | 701/38 |
| 5,088,762 A | * | 2/1992 | Fukuyama et al. | 280/5.508 |
| 5,217,246 A | | 6/1993 | Williams et al. | |
| 5,251,136 A | * | 10/1993 | Fukuyama et al. | 701/38 |
| 5,383,680 A | * | 1/1995 | Bock et al. | 280/5.503 |
| 5,574,445 A | | 11/1996 | Maresca et al. | |
| 5,619,413 A | | 4/1997 | Oakley et al. | |
| 6,000,702 A | | 12/1999 | Streiter | |
| 6,179,310 B1 | | 1/2001 | Clare et al. | |
| 7,063,334 B2 | * | 6/2006 | Lim | 280/5.506 |
| 2002/0109310 A1 | | 8/2002 | Lim | |

FOREIGN PATENT DOCUMENTS

EP    0 607 516 A    7/1994

OTHER PUBLICATIONS

Karnopp, D., "Active and Semiactive Vibration Isolation," Journal of Vibrations and. Acoustics, vol. 117, No. 3B, pp. 177-185 (Jun. 1995).
D. Hrovat, "Survey of advanced suspension developments and related optimal control application," Automatica 33 (10), pp. 1781-1817 (1997).
Office Action from counterpart Chinese Application No. 200510078926.3 dated Mar. 21, 2008.

* cited by examiner

*Primary Examiner*—S. Joseph Morano
*Assistant Examiner*—Robert J. McCarry, Jr.
(74) *Attorney, Agent, or Firm*—Fish & Richardson P.C.

(57) ABSTRACT

An active suspension system for a motor vehicle, in which a controller has a first input and an output. The first input receives a roll command-signal generated in response to a turn executed by the vehicle. The output provides a control signal for causing a chassis of the vehicle to roll to an angle determined by the turn.

14 Claims, 5 Drawing Sheets

ACTIVE SUSPENSION CONTROLLER

FIELD OF INVENTION

This invention relates to suspension systems for motor vehicles, and in particular, to active suspension systems.

BACKGROUND

When an automobile enters a turn, there exists a tendency for its chassis to roll outward, in a direction away from the center of the turn. For many passengers, this can be an uncomfortable, if not alarming, sensation.

Active suspension systems attempt to overcome this tendency to roll outward by measuring the attitude of the chassis relative to the wheels and applying forces that attempt to overcome those forces that cause the automobile to roll away from the turn. These systems attempt to hold the chassis level during the turn.

SUMMARY

The invention includes an apparatus for controlling an active suspension system in a motor vehicle, an active suspension including such an apparatus, and/or a motor vehicle including such an apparatus.

In one aspect, the apparatus includes a controller having a first input and an output. The first input receives a roll command-signal associated with a turn executed by the vehicle. The output provides a control signal for causing a chassis of the vehicle to tend to roll to an angle in response to the roll command-signal.

In certain embodiments, the controller further includes a second input to receive a vertical position of the chassis. In such embodiments, the controller is configured to determine the control signal at least in part on the basis of a combination of the position signal and the roll command-signal.

In other embodiments, the controller is configured to generate a control signal to tend to roll to an angle that depends on tire compression.

Certain other embodiments also include a roll command-signal generator having an input to receive data indicative of selected attributes of a turn and an output to provide the roll command-signal to the first input of the controller.

The roll command-signal generator can be configured to generate a roll command-signal at least in part on the basis of speed data and direction data. The speed data indicates a magnitude of a velocity of the motor vehicle. The direction data indicates a radius of curvature of the turn.

Alternatively, the roll command-signal generator can be configured to generate a roll command-signal at least in part on the basis of a yaw signal. The yaw signal in such an embodiment is indicative of the attributes of the turn.

The roll command-signal generator can also be configured to derive a quantity indicative of the attributes of the turn. An exemplary quantity is turn rate. Turn rate can be computed, for example, by squaring the speed data and multiplying the result thereof by the direction data.

For those embodiments in which the roll-command signal generator is configured to derive a quantity indicative of the attributes of the turn, the roll-command signal generator can be configured in a variety of ways.

In some of these embodiments, the roll-command signal generator is configured to generate a roll-command signal that is a function of that quantity. For example, the roll command-signal generator might be configured to generate a roll command-signal for causing the controller to roll the chassis by an amount proportional to the quantity. The constant of proportionality can be selected, for example, on the basis of tire properties. Or, within a selected range of values of the quantity, the roll command-signal generator can be configured to generate a roll command-signal for causing the controller to roll the chassis by an amount that depends non-linearly on the quantity.

Alternatively, within a first range of values of the quantity, the roll command-signal generator is configured to generate a roll command-signal for causing the controller to roll the chassis by an amount proportional to the quantity, and within a second range of values of the quantity, the roll command-signal generator is configured to generate a roll command-signal for causing the controller to roll the chassis by an amount proportional to the quantity. The constants of proportionality for the first and second range of values can, in general, differ from each other.

In other embodiments, within a first range of values of the quantity, the roll command-signal generator is configured to generate a roll command-signal for causing the controller to roll the chassis by an amount proportional to the quantity. Within a second range of values of the quantity, the roll command-signal generator is configured to generate a roll command-signal for causing the controller to roll the chassis by an amount that is independent of the quantity.

In yet other embodiments, for values of the quantity that are less than a threshold, the roll command-signal generator is configured to generate a roll command-signal for causing the controller to roll the chassis by an amount proportional to the quantity. For values of the quantity that are greater than the threshold, the roll command-signal generator is configured to generate a roll command-signal for causing the controller to roll the chassis by an amount that is independent of the quantity.

There are also embodiments in which, for values of the quantity that are greater than a threshold, the roll command-signal generator is configured to generate a roll command-signal for causing the controller to roll the chassis by an amount proportional to the quantity. For values of the quantity that are less than the threshold, the roll command-signal generator is configured to generate a roll command-signal for causing the controller to roll the chassis by an amount that is independent of the quantity.

In another aspect, the invention includes a method and an active suspension system for carrying out a method for controlling a roll angle of a chassis of a motor vehicle in response to a turn executed by the motor vehicle.

Such a method includes receiving a feedback signal indicative of a vertical displacement of the chassis and combining a roll command-signal indicative of selected attributes of the turn with the feedback signal. This results in a modified feedback signal. At least in part on the basis of the modified feedback signal, a control signal for urging the roll angle toward a desired value is determined.

Among the embodiments of the method include those in which defining selected attributes of a turn includes deriving a quantity indicative of the attributes of the turn.

Also among the embodiments are those that include configuring the roll command-signal generator to generate a roll command-signal that is a function of a quantity indicative of the attributes of the turn. This can include determining that the quantity is within a selected range of values and generating a roll command-signal for causing the controller to roll the chassis by an amount proportional to the quantity.

Other embodiments include those in which deriving a quantity includes deriving a quantity at least in part on the basis of speed data and direction data. The speed data indicates a magnitude of a velocity of the motor vehicle. The direction data indicates a radius of curvature of the turn.

A variety of ways are available to compute the quantity. One embodiment of the method includes computing the quantity by multiplying the square of the speed data by the direction data. Another embodiment includes deriving the quantity at least in part on the basis of a yaw signal. In this case, the yaw signal is indicative of attributes of the turn.

In another aspect, the invention includes an active suspension system for a motor vehicle. The system includes a controller with a first input and an output. The first input receives a roll command-signal generated in response to a turn executed by the vehicle. The output provides a control signal for causing a chassis of the vehicle to tend to roll toward a center of the turn.

In certain embodiments, the controller is configured to cause the chassis of the vehicle to roll inward toward the center of the turn to achieve a negative roll angle.

Other embodiments include a roll command-signal generator having an input and an output. The input receives data indicative of selected attributes of a turn. The output provides the roll command-signal to the first input of the controller. In some embodiments, the roll command-signal generator is configured to generate a roll command-signal at least in part on the basis of speed data indicative of a magnitude of a velocity of the motor vehicle; and direction data indicative of a radius of curvature of the turn.

In other embodiments, the roll command-signal generator is configured to generate a roll command-signal at least in part on the basis of a yaw signal, the yaw signal being indicative of the attributes of the turn.

In other embodiments, the roll command-signal generator is configured to derive a quantity indicative of the attributes of the turn.

In other embodiments, the roll command-signal generator is configured to generate a roll command-signal that is a function of the quantity. For example, within a selected range of values of the quantity, the roll command-signal generator can be configured to generate a roll command-signal for causing the controller to roll the chassis by an amount proportional to the quantity. Or, within a first range of values of the quantity, the roll command-signal generator can be configured to generate a roll command-signal for causing the controller to roll the chassis by an amount proportional to the quantity, and within a second range of values of the quantity, the roll command-signal generator can be configured to generate a roll command-signal for causing the controller to roll the chassis by an amount proportional to the quantity. The constants of proportionality for the first and second range of values can differ from each other.

Additional embodiments include those in which the controller includes a second input to receive a vertical position of the chassis. In these embodiments, the controller is configured to determine the control signal at least in part on the basis of a combination of the position signal and the roll command-signal.

In another aspect, the invention includes a method, and an active suspension system for carrying out a method, for controlling a roll angle of a chassis of a motor vehicle in response to a turn executed by the motor vehicle.

Embodiments include those in which a feedback signal indicative of a measurement of a vertical displacement of the chassis is received. A roll-command signal is then combined with a feedback signal to generate a modified feedback signal. The roll-command signal is indicative of selected attributes of the turn. At least in part on the basis of the modified feedback signal, a control signal is determined such that the chassis is urged to roll toward a center of the turn.

Embodiments include those in which the chassis of the vehicle is urged to roll inward toward the center of the turn to achieve a negative roll angle.

Other embodiments include defining a quantity indicative of the attributes of the turn. In those embodiments, the roll command-signal generator can be configured to generate a roll command-signal that is a function of the quantity.

Particular examples of generating such roll command-signals include determining that the quantity is within a selected range of values; and generating a roll command-signal for causing the controller to roll the chassis by an amount proportional to the quantity.

A variety of ways are available to derive the quantity. For example, the quantity can be derived at least in part on the basis of speed data indicative of a magnitude of a velocity of the motor vehicle; and direction data indicative of a radius of curvature of the turn. Or, the quantity can be derived at least in part on the basis of a yaw signal.

Other features and advantages of the invention will be apparent from the following detailed description, and from the claims.

DETAILED DESCRIPTION

Figure 1:
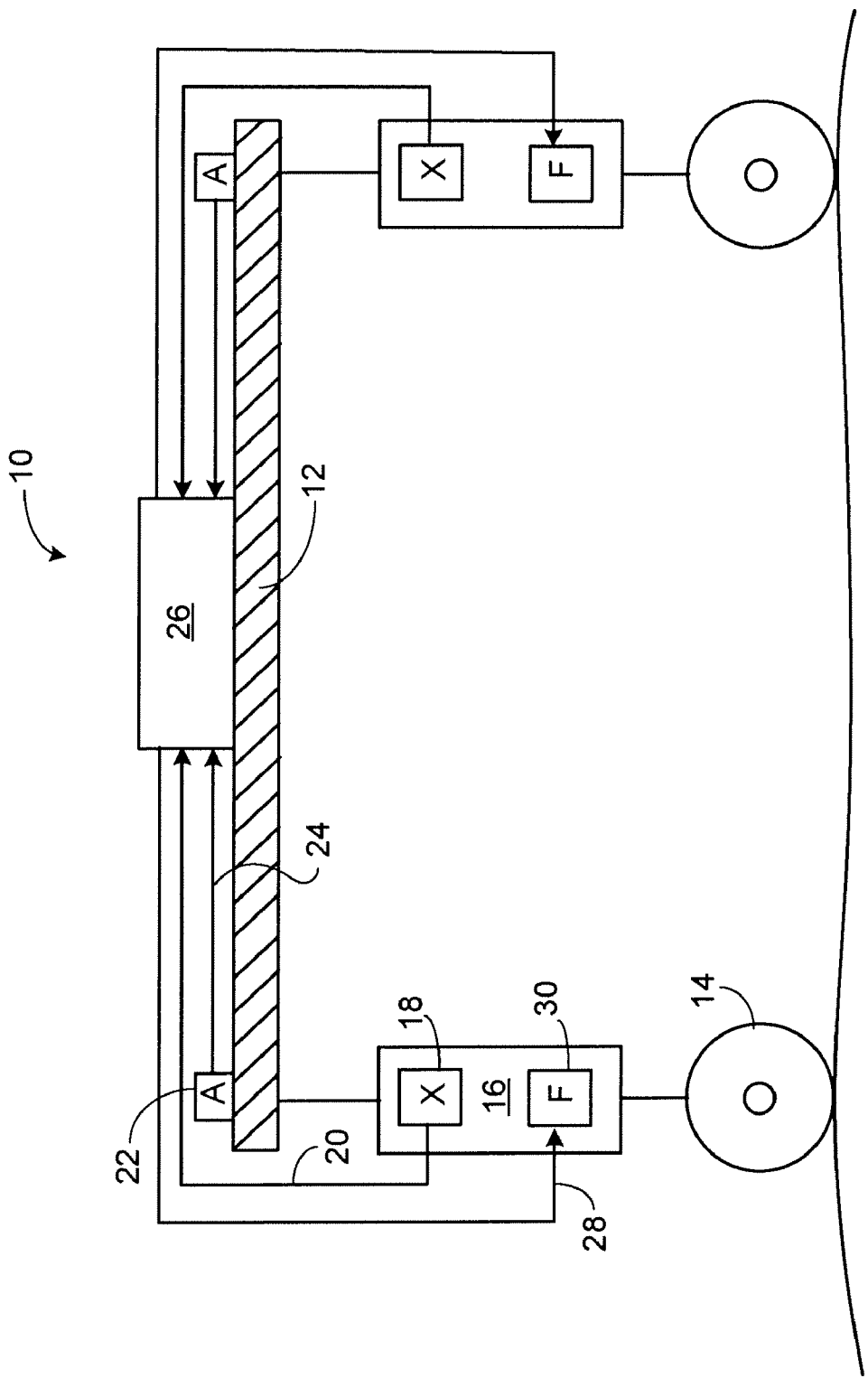
FIG. 1 is a schematic side view of an active suspension.

An automobile 10, shown in FIG. 1, includes a chassis 12 coupled to four wheels 14 (only two of which are shown) by active suspension elements 16 at each of its four corners. Each active suspension element 16 dynamically receives control signals, control signals may be generated by components co-located with suspension elements or displaced elsewhere in the vehicle, that ultimately cause active suspension elements to alter or otherwise control the attitude of the chassis 12 relative to the wheels 14. An active suspension system uses the four active suspension elements 16 to dynamically control vehicle attitude.

To control the attitude of the chassis 12, it is useful to first measure it. For this purpose, the automobile 10 includes eight sensors, two of which are associated with each corner of the automobile 10. Four of the sensors are position sensors 18, each of which provides a position signal 20 indicative of a vertical distance between a reference datum and a corresponding point on the chassis 12 of the automobile 10. The reference datum can be a point on the wheel. Alternatively, the position sensor 18 can report the distance between the chassis 12 and the road surface. A suitable position sensor 18 is described in commonly-owned U.S. Pat. No. 5,574,445, entitled "Digital Absolute Position Encoder," the contents of which are incorporated by reference.

The remaining four sensors are accelerometers 22 mounted on the four corners of the chassis 12. Each accelerometer provides an output that, when integrated, is a velocity signal 24 indicative of a vertical velocity of the chassis 12 relative to the vehicle's frame of reference. Collectively, these sensors 18, 22 provide information indicative of the attitude of the chassis 12.

The position sensors 18 and the accelerometers 22 communicate corresponding position and velocity signals 20, 24 to a controller 26. In response to these signals, the controller 26 calculates four dynamically-generated control signals 28 and communicates those signals to four corresponding force transducers 30 within each of the suspension elements 16. In response to a control signal 28, each force transducer 30 causes exertion of a force between a corresponding wheel 14 and the chassis 12. The controller 26 calculates the control signals 28 so that the resulting forces applied between the chassis 12 and each wheel 14 cooperate to maintain a desired attitude of the chassis 12.

Commonly-owned U.S. Pat. No. 4,981,309, entitled "Linear Transducing Along a Path" describes force transducers 30 suitable for use in an automobile 10. Commonly-owned U.S. Pat. No. 4,960,290, entitled "Wheel Assembly Suspending" describes an example of incorporating force transducers 30 and sensors at each wheel 14. The contents of both of these patents are incorporated by reference.

When an automobile 10 turns, the resulting change in momentum causes it to experience a centrifugal force. The centrifugal force tends to compress suspension elements and tires on the outside of the turn and to expand the suspension elements and tires on the inside of the turn. These effects combine to roll the automobile 10 outward, away from the center 32 of the turn, as shown in FIG. 2.

Figure 3:
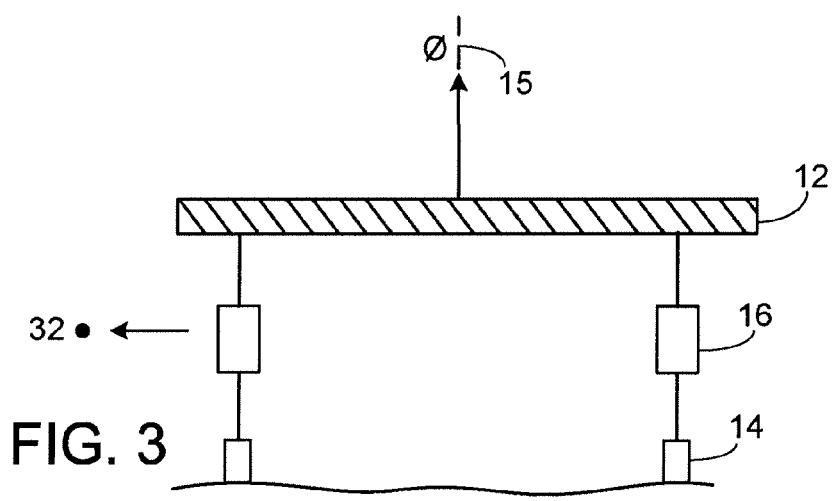

Among the tasks of the controller 26 is to dynamically generate control signals 28 that maintain a roll angle $\phi$ 15 at a desired set point. The desired set point can be set arbitrarily. The set point can be made an arbitrary function of vehicle dynamics. For example, the controller 26 may be configured to cause the chassis 12 to remain level with the road regardless of how sharp or fast the turn is, as shown in FIG. 3. In this case, however, the passengers may experience an unpleasant sensation of being pushed sideways off their seats by a lateral force.

Figure 4:
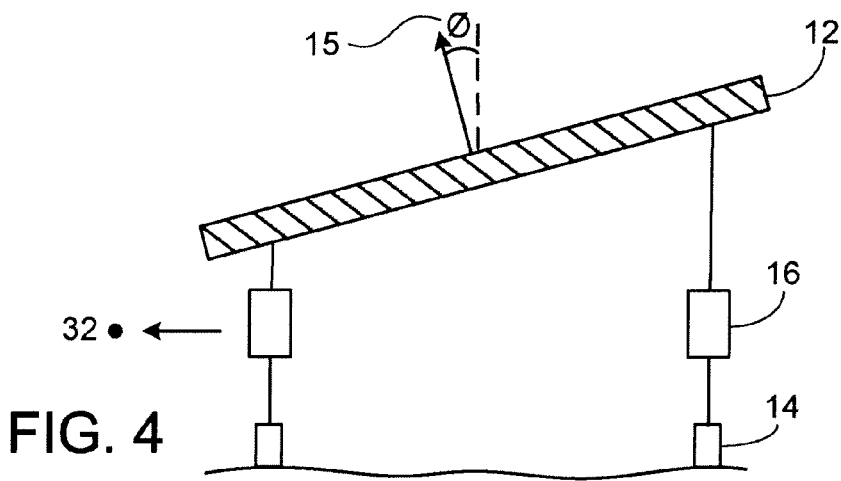

Alternatively, the desired set point can be dependent on the centrifugal force. For example, the controller 26 may cause the chassis 12 to roll inward, toward the center 32 of the turn, as shown in FIG. 4. The extent of the inward roll can be dynamically controlled so that passengers experience the turn much as they would experience a turn on a properly banked airplane.

Figure 2:
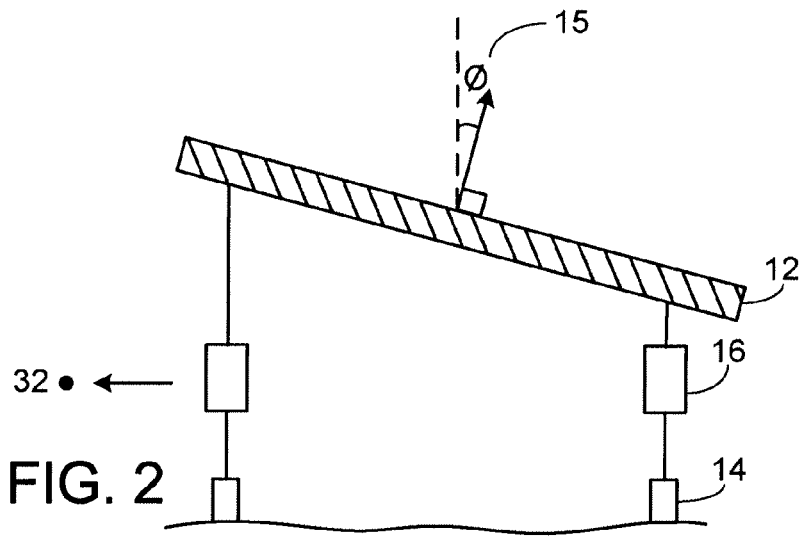
FIGS. 2-4 are schematic side views of a chassis in a turn.

For purposes of discussion, a positive roll angle $\phi$ 15 indicates a vehicle chassis that is rolled outward relative to the turn center, as shown in FIG. 2 and a negative roll angle $\phi$ 15 represents a vehicle chassis that is rolled inward with respect to the center of a turn, as shown in FIG. 4.

Figure 5:
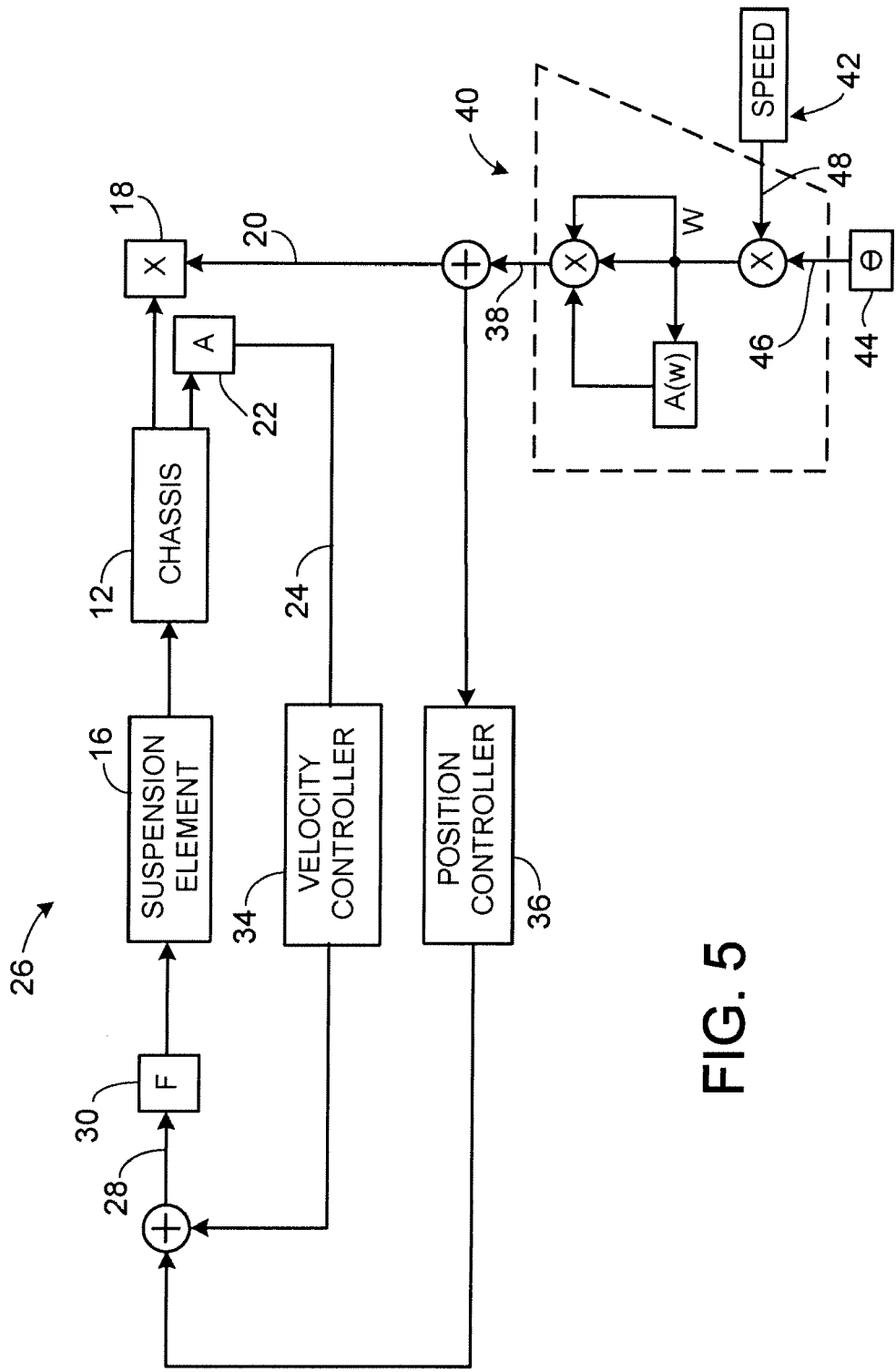
FIG. 5 is a block diagram of a controller.

As shown in FIG. 5, a controller 26 for controlling a roll angle 15 includes a roll velocity controller 34 that receives the roll velocity signal 24. The roll velocity controller can be a simple proportional gain controller of the conventional type.

The controller 26 also includes a roll position controller 36 that receives the roll position signal 20. The roll position signal 20, however, is biased by a roll command-signal 38 before it is provided to the position controller 36.

The process of computing the forces needed at each of the corners of a vehicle to achieve the setpoint attitude begins by calculating a roll velocity $V_{ROLL}$ 24 and a roll displacement $X_{ROLL}$ 20 which can be computed, in blocks 22 and 18 respectively, based on velocity and roll displacement measurements at the corners of the vehicle. One common method for calculating $V_{ROLL}$ 24, implemented in block 22, is given by:

$$V_{ROLL} = \frac{1}{4}(V_{LF} + V_{LR} - V_{RR} - V_{RF})$$

where $V_{LF}$, $V_{LR}$, $V_{RR}$, and $V_{RF}$ are velocities of the left-front, the left-rear, the right-rear, and the right-front corners of the vehicle respectively. Similarly, the roll displacement of a four-wheel vehicle 20 can be computed, as implemented in block 18, by combing the four position signals using the formula:

$$X_{ROLL} = \frac{1}{4}(X_{LF} + X_{LR} - X_{RR} - X_{RF})$$

where $X_{LF}$, $X_{LR}$, $X_{RR}$, and $X_{RF}$ are displacements of the left-front, the left-rear, the right-rear, and the right-front corners of the vehicle respectively. Thus, the magnitude of the roll velocity provides a measure of how fast the automobile 10 is rolling, and the sign of the roll velocity indicates whether the automobile 10 is rolling inward, toward the center of the turn, or outward, away from the center of the turn. Similarly, the roll displacement provides a measure of the roll angle 15, and whether the automobile 10 is banked inward, toward the center of the turn, or outward, away from the center of the turn.

There are a variety of methods for computing the solid-body roll velocity and roll displacement of a vehicle body. Other linear combinations might be used. Additionally, the solid-body degrees of freedom can be calculated using only a subset of the sensors or using different combinations and types of sensors.

Referring again to FIG. 5, the roll component of velocity, $V_{ROLL}$, is processed by the roll velocity controller 34 and the roll component of displacement, $X_{ROLL}$, is processed by the roll position controller 36. The outputs of these controller are combined to create the roll control signal 28. The roll control signal 28 is distributed to the four corners by inverting the $V_{ROLL}$ and $X_{ROLL}$ formulas. Specifically, for the example given, the left corners of the vehicle use the roll control signal 28 and the right corners of the vehicle use the negative of the signal 28.

More generally, in matrix notation, the output of the position controller 36 is given by $T^{-1} KT(\vec{x} + \vec{y})$ where $\vec{x}$ is a vector containing the position sensor measurements $$\begin{pmatrix} X_{LF} \\ X_{LR} \\ X_{RR} \\ X_{RF} \end{pmatrix}$$

and $\vec{y}$ is a vector containing the position command signals. T is a matrix that transforms $\vec{x}$ into an invertible coordinate system that includes roll. One such coordinate system is that defined by heave, pitch, roll, and twist coordinates:

$$T = \frac{1}{4}\begin{bmatrix} 1 & 1 & 1 & 1 \\ 1 & -1 & -1 & 1 \\ 1 & 1 & -1 & -1 \\ 1 & -1 & 1 & -1 \end{bmatrix}$$

Other coordinates systems can also be used. K is an arbitrary 4×4 position controller matrix that includes roll control.

In one embodiment, the roll position controller 36 is a proportional plus integral (PI) controller or a PID controller. In this case, any error between the roll command-signal 38 and the roll position signal 20 will eventually be integrated away. In another embodiment, the roll position controller 36 is a proportional (P) gain controller. In this case, there will be a non zero DC error. The PI, PID or P controller parameters can be chosen to meet a variety of performance criteria. For example, parameters may be chosen to achieve a closed-loop bandwidth that lies within a predetermined range, such as a few Hz (e.g. between 1 and 5 Hz).

The roll command-signal 38 is generated by a roll command-signal generator 40 that is connected to a speed sensor 42 and a direction sensor 44. The direction sensor 44 provides a direction signal 46 indicative of the radius of curvature of a turn. The direction sensor 44 can, for example, be coupled to a steering wheel to provide a direction signal 46 that corresponds to the angle made by the front wheels relative to a longitudinal axis of the automobile 10. The speed sensor 42 provides a speed signal 48 indicative of the magnitude of the automobile's velocity vector. The speed sensor 42 can be coupled to the same signal that controls a speedometer.

The roll command-signal generator 40 combines the speed signal and the direction signal to generate a quantity, referred to as a turn rate, $\omega$, that provides a measure of the angular acceleration being experienced by the automobile 10 about an axis normal to its plane of travel. The turn rate thus measures how "tight" a turn is. For example, the roll command-signal generator 40 can multiply the square of the speed signal by the direction signal to generate the turn rate $\omega$. Alternatively, the roll command-signal generator 40 can be connected to a yaw sensor, in which case the turn rate $\omega$ can be derived from a measured yaw rate.

In one embodiment, $\omega$ can be used as the roll command-signal 38 to be combined with the roll position signal 20. However, it may be desirable to provide a gain $A(\omega)$, the magnitude of which depends on $\omega$, to control the extent to which the chassis 12 rolls. In this case, the roll command-signal 38 becomes $A(\omega)\omega$. The sign of the roll command-signal 38, which depends on the sign of $\omega$, controls whether the chassis 12 should roll inward or outward during a turn. The magnitude of the gain $A(\omega)$ controls the desired extent to which the chassis 12 rolls in response to a turn. The gain of the roll position controller 36 controls the roll rate at which the chassis 12 rolls in response to a turn.

Figure 6:
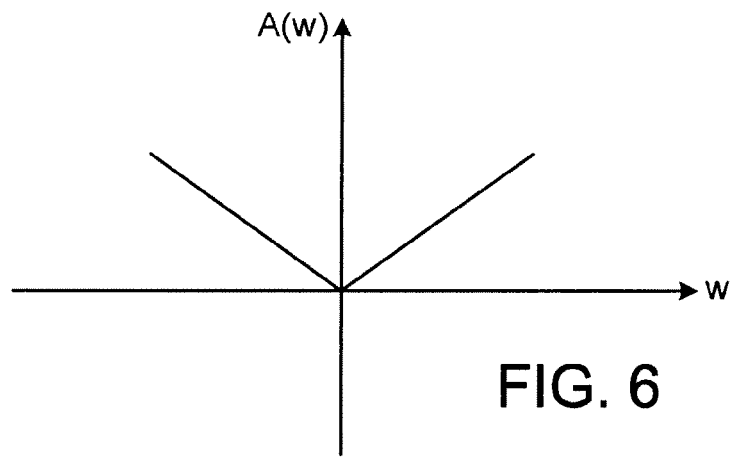
FIGS. 6-10 show exemplary gain functions.

For example, FIG. 6 shows a linear relationship between $A(\omega)$ and $\omega$. Assuming a linear relationship between tire compression and $\omega$, by appropriately choosing the slope of $A(\omega)$ the illustrated gain function can be used to neutralize the roll that would otherwise accompany tire compression. For the general case of a nonlinear relationship between tire compression and $\omega$, nonlinear $A(\omega)$ and $\omega$ (e.g, FIG. 10 as below) can be used. In practice, the slope of the gain $A(\omega)$ can be determined experimentally by measuring the amount of tire compression associated with different values of $\omega$. Increasing the magnitude of the gain $A(\omega)$ yet further will cause the vehicle to not only compensate for tire compression, but also to roll inward during a turn. The amount of the inward roll is determined by the slope of the gain $A(\omega)$. The function is symmetric about the $\omega=0$ axis so that positive values of $\omega$ cause the chassis 12 to roll in a first direction and negative values of $\omega$ cause the chassis 12 to roll in a second direction opposite the first direction.

Figure 7:
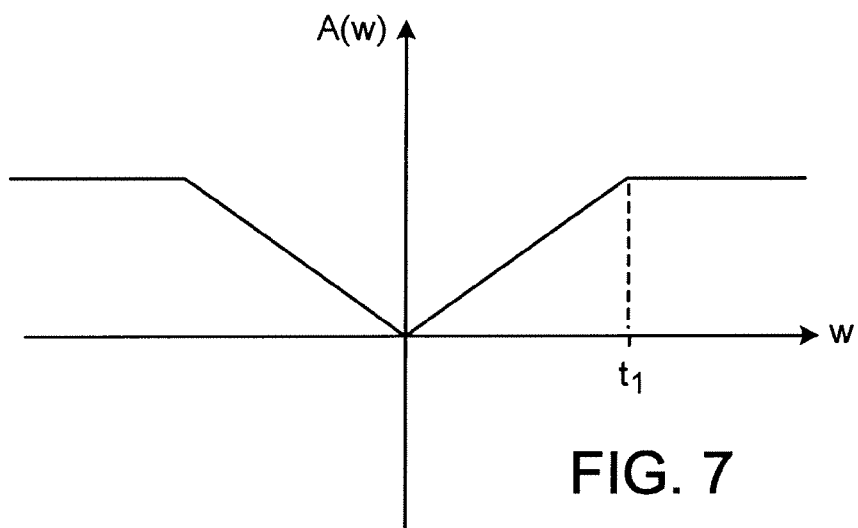

FIG. 7 shows another example of a gain function $A(\omega)$. The illustrated gain function varies linearly with $\omega$ when $\omega$ has a magnitude below some threshold $t_1$. Above the threshold, the gain is held constant. This corresponds to a controller that limits the maximum amount of roll compensation for large values of $\omega$.

Figure 8:
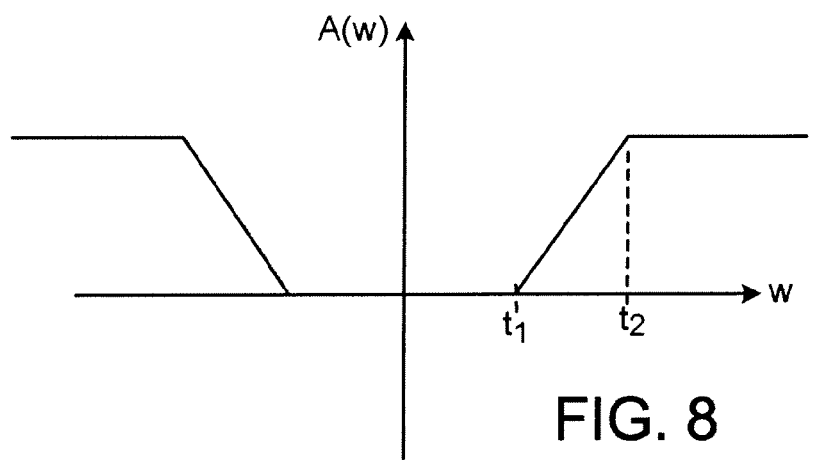

FIG. 8 shows another example of a gain function $A(\omega)$. The illustrated gain function is constant for values of $\omega$ having a magnitude below a first threshold $t_1$ and for values of $\omega$ having a magnitude above a second threshold $t_2$. In between these two thresholds, the gain function is linear with a particular slope. This would correspond to a controller that rolls the automobile 10 progressively to larger angles once the turn is sufficiently tight (i.e. once $\omega$ surpasses $t_1$), but does nothing until then. When $\omega$ reaches the second threshold $t_2$, the maximum amount of roll compensation is reached.

Figure 9:
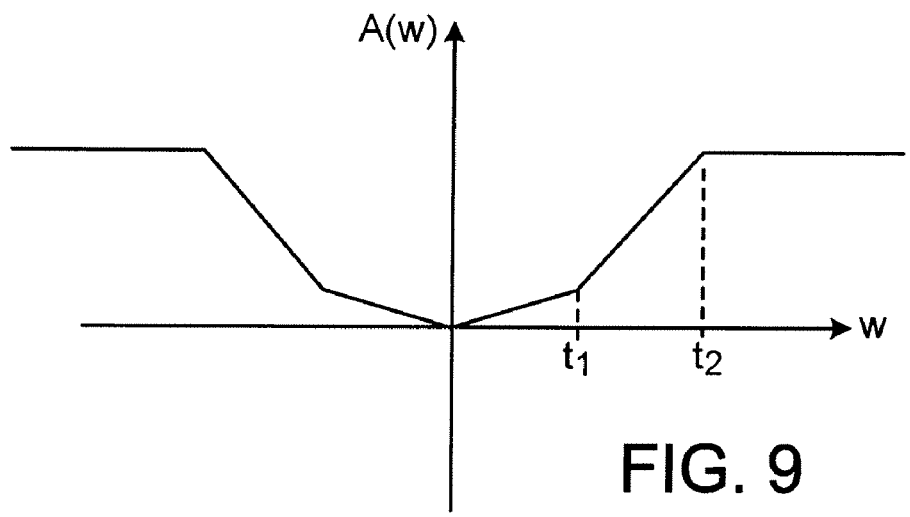

FIG. 9 shows an example of a gain function in which, for $\omega$ having a magnitude below a threshold magnitude $t_1$, the function is linear with a shallow slope selected to neutralize the roll that would otherwise accompany tire compression. Beyond that threshold, the function is linear with a steeper slope. This provides additional roll, the extent of which is selected to enhance passenger comfort during a turn. The optimal value of roll angle 15, and its dependence on turn rate is subjective and is determined experimentally. Typically, a desirable inward roll angle 15 of the automobile 10 is less than a few degrees. When the magnitude of $\omega$ reaches the second threshold $t_2$, the maximum amount of roll compensation is reached.

Figure 10:
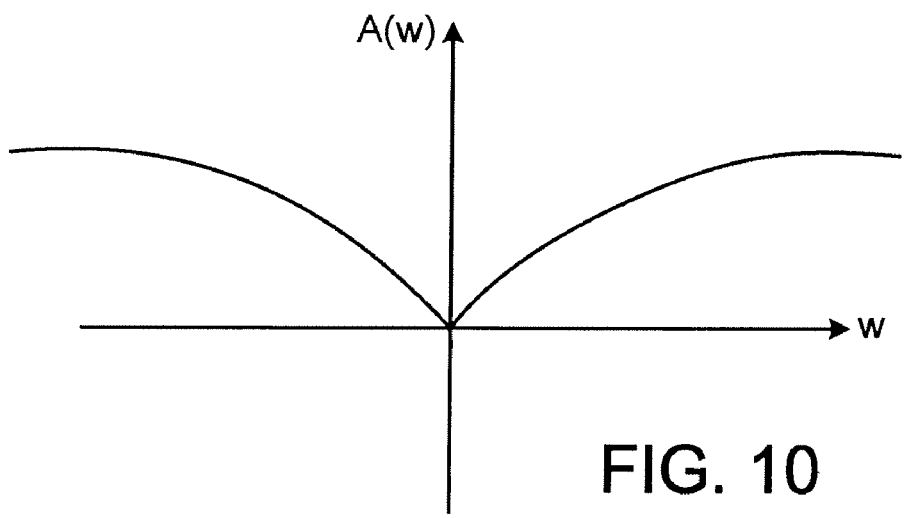

FIG. 10 shows an example of an arbitrary nonlinear gain function.

FIGS. 6, 7, 8, 9, and 10 show exemplary gain functions. However, other gain functions can be used for achieving similar and other effects. For example, although the functions disclosed are all symmetric about the $\omega=0$ axis, this need not be the case. Gain functions can also be asymmetric about that axis. The gain functions may be represented as piece-wise linear functions of $\omega$, such as those shown in FIGS. 6-9, or they may be arbitrary non-linear functions of $\omega$ as shown in FIG. 10.

Other implementations are within the scope of the claims. For example, while the active suspension system has been described in the context of a chassis 12 supported by four wheels 14, the system can readily be adapted to the case of a chassis 12 supported by three wheels, or by more than four wheels.

The force transducer 30 can be the only suspension element at each wheel. Alternatively, the force transducer 30 may co-exist with additional suspension elements, such as springs or dampers. Any type of force transducer 30, for example a linear electromagnetic actuator, a hydraulic ram, a rotary electric motor or a variable spring, can be used. In general, the invention is applicable to vehicle suspension systems with any type of controllable suspension element.

In some embodiments, the controller 26 is a type of skyhook damper controller. However, the roll angle 15 of the chassis 12 can also be controlled by injecting a roll command-signal 38 into any linear or non-linear controller. In addition, while the foregoing description refers to a controller for an active suspension in an automobile, the controller can also be used for controlling an active suspension in other motor vehicles, such as trucks, buses, and vans, as well as to control active suspensions in three-wheeled vehicles, or on trains.

Moreover, while the controller has been described in connection with wheeled vehicles, it can also be used to control active suspensions in other terrestrial vehicles, such as snowmobiles, or tracked vehicles such as tanks or heavy construction equipment.

This description is intended to illustrate and not limit the scope of the appended claims.

I claim:

1. An apparatus for controlling an active suspension system in a vehicle, the apparatus comprising:
    a controller having
        a first input to receive a roll command-signal associated with a turn executed by the vehicle, the turn causing a force urging the vehicle to roll by a first angle; and
        an output to provide a control signal to cause a chassis of the vehicle to tend to roll to a second angle, the extent of the second angle being dependent on the roll command-signal, the second angle being selected to have a sign opposite the sign of the first angle and to have an absolute value greater than the absolute value of the first angle.

2. The apparatus of claim 1, further comprising a roll command-signal generator having:
    an input to receive data indicative of selected attributes of a turn; and
    an output to provide the roll command-signal to the first input of the controller.

3. The apparatus claim 2, wherein the roll command-signal generator is configured to generate the roll command-signal at least in part on the basis of:
    speed data indicative of a magnitude of a velocity of the motor vehicle; and
    direction data indicative of a radius of curvature of the turn.

4. An active suspension system comprising
    a controller having
        a first input to receive a roll command-signal associated with a turn executed by the vehicle, the turn causing a force urging the vehicle to roll by a first angle; and
        an output to provide a control signal to cause a chassis of the vehicle to tend to roll to a second angle, the extent of the second angle being dependent on the roll command-signal, the second angle being selected to have a sign opposite the sign of the first angle and to have an absolute value greater than the absolute value of the first angle.

5. A motor vehicle comprising
    a controller having
        a first input to receive a roll command-signal associated with a turn executed by the vehicle, the turn causing a force urging the vehicle to roll by a first angle; and
        an output to provide a control signal to cause a chassis of the vehicle to tend to roll to a second angle, the absolute value of which is greater than the absolute value of the first angle, the extent of the second angle being dependent on the roll command-signal, the second angle being selected such that, during the turn, the body of the vehicle is banked into the turn at an angle having a sign opposite the sign of the first angle.

6. An apparatus for controlling an active suspension system in a motor vehicle, the apparatus comprising:
    a controller having
        a first input to receive a roll command-signal associated with a turn executed by the vehicle, the turn causing a force urging the vehicle to roll by a first angle having a first value; and
        an output to provide a control signal for causing a chassis of the vehicle to tend to roll a second angle having an absolute value greater than the absolute value of the first angle and a sign opposite the sign of the first angle, wherein the output is selected to cause the chassis to maintain an inward roll angle during the turn, the inward roll angle having a sign opposite the sign of the first angle.

7. The apparatus of claim 6, wherein the controller is configured to cause the chassis of the vehicle to roll inward toward the center of the turn to achieve a roll angle having a sign opposite the sign of the first angle.

8. The apparatus of claim 6, further comprising a roll command-signal generator having:
    an input to receive data indicative of selected attributes of a turn; and
    an output to provide the roll command-signal to the first input of the controller.

9. The apparatus of claim 8, wherein the roll command-signal generator is configured to generate the roll command-signal at least in part on the basis of:
    speed data indicative of a magnitude of a velocity of the motor vehicle; and
    direction data indicative of a radius of curvature of the turn.

10. The apparatus of claim 8, wherein the roll command-signal generator is configured to derive a quantity indicative of the attributes of the turn.

11. The apparatus of claim 10, wherein the roll command-signal generator is configured to generate a roll command-signal that is a function of the quantity.

12. The apparatus of claim 11, wherein, within a selected range of values of the quantity, the roll command-signal generator is configured to generate a roll command-signal for causing the controller to roll the chassis by an amount proportional to the quantity.

13. A motor vehicle comprising
    a controller having
        a first input to receive a roll command-signal associated with a turn executed by the vehicle, the turn causing a force urging the vehicle to roll by a first angle; and
        an output to provide a control signal for causing a chassis of the vehicle to tend to roll by a second angle having an absolute value greater than the absolute value of the first angle and a sign opposite the sign of the first angle, wherein the output is selected to cause the chassis to maintain a roll-angle during the turn, the roll-angle having a sign opposite the sign of the first angle.

14. An active suspension system comprising
    a controller having
        a first input to receive a roll command-signal associated with a turn executed by the vehicle, the turn causing a force urging the vehicle to roll by a first angle; and
        an output to provide a control signal for causing a chassis of the vehicle to tend to roll by a second angle having an absolute value greater than the absolute value of the first angle and a sign opposite the sign of the first angle, wherein the output is selected to cause the chassis to maintain a roll angle during the turn, the roll-angle having a sign opposite the sign of the first angle.

* * * * *